(No Model.)
T. W. JAMISON.
VELOCIPEDE.
No. 447,246.                    Patented Feb. 24, 1891.
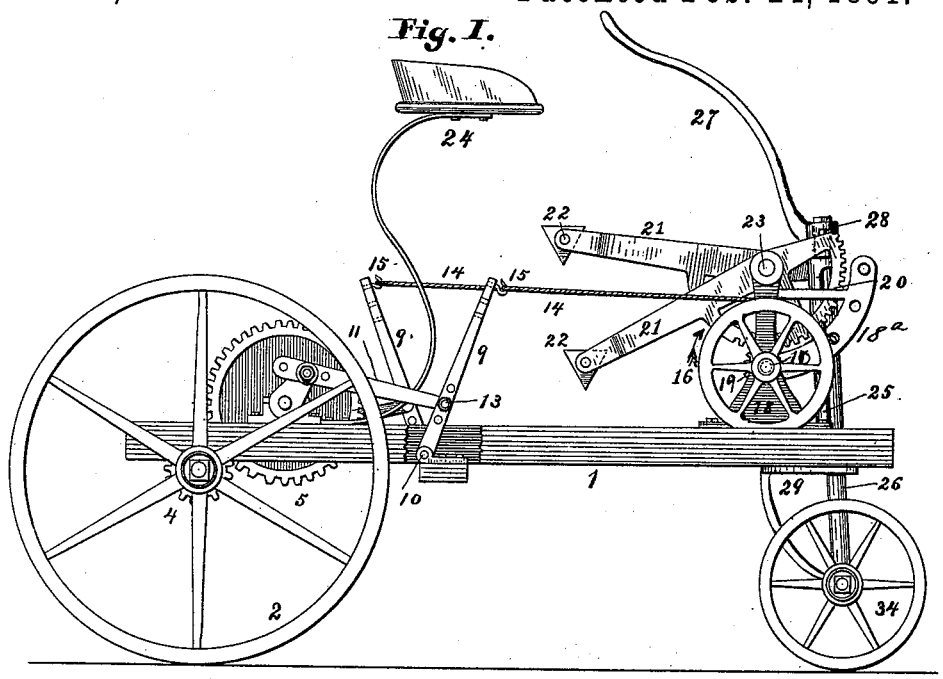
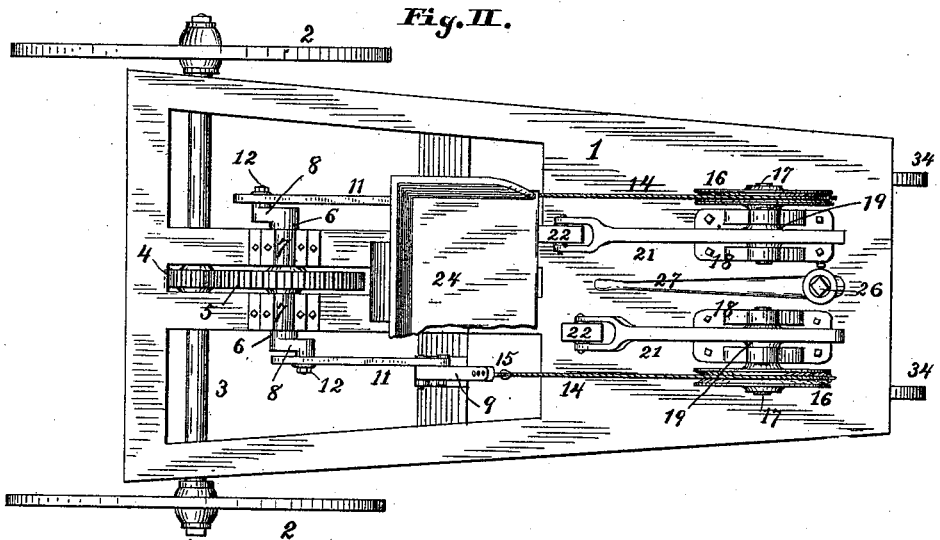
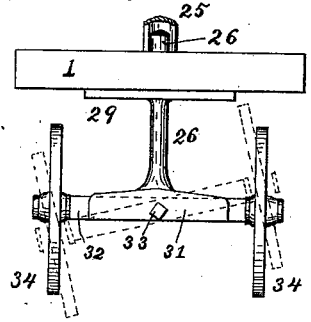
Attest:
Emma Arthur
Walter E. Allen
Inventor:
T. W. Jamison.
By Knight Bro
Attys

UNITED STATES PATENT OFFICE.

THOMAS W. JAMISON, OF SALISBURY, MISSOURI, ASSIGNOR OF ONE-HALF TO THOMAS H. WALTON, OF SAME PLACE.

VELOCIPEDE.

SPECIFICATION forming part of Letters Patent No. 447,246, dated February 24, 1891.

Application filed September 5, 1890. Serial No. 363,983. (No model.)

*To all whom it may concern:*

Be it known that I, THOMAS W. JAMISON, of Salisbury, in the county of Chariton and State of Missouri, have invented a certain new and useful Improvement in Velocipedes, of which the following is a full, clear, and exact description, reference being had to the accompanying drawings, forming part of this specification.

My invention relates to certain improvements in the power-applying mechanism for velocipedes; and my invention consists in features of novelty hereinafter fully described, and pointed out in the claims.

Figure I is a side elevation illustrative of my invention. Fig. II is a top view. Fig. III is a detail front elevation.

Referring to the drawings, 1 represents the frame or body of the velocipede.

2 represents the rear wheels, which are rigidly secured to an axle or shaft 3, so as to turn therewith or be turned thereby. The axle or shaft is secured to the body or frame 1 by any suitable means which will permit it to turn. On the shaft or axle 3 there is rigidly secured a pinion 4, which is engaged by a cog-wheel 5, secured to a crank-shaft 6, journaled to the frame or body 1 by means of boxes 7.

8 represents the cranks on the shaft 6.

9 represents levers pivoted at 10 to the body or frame 1 and extending upwardly from their pivots. These levers are connected by straps or rods 11 to the cranks 8, the cranks being provided with wrist-pins and nuts 12, by which the straps or rods are connected to the cranks, and the connection between the straps or rods and the levers 9 is made by means of bolts 13. There are a number of holes or perforations in the outer ends of the straps or rods 11, in any one of which the wrist-pins of the cranks may be placed, and there are also a number of holes or perforations in the levers 9, in any one of which the bolts 13 may be placed.

14 represents cords or cables (small wire cables being preferably used) connected to the upper ends of the levers 9 by means of hooks 15, the upper ends of the levers having a number of perforations, into any one of which the hooks may be inserted. The forward ends of the cords or cables 14 are connected to oscillating drums or wheels 16, which are preferably grooved, as shown in Fig. II, to receive the cords or cables. These drums or wheels are rigidly secured to short shafts 17, journaled to the body or frame 1 by means of brackets or boxes 18. On each shaft 17 there is a pinion 19, the pinions being rigidly secured to the shafts. The brackets 18 extend upwardly a distance from the shafts 17 and have journaled in their upper ends rack-segments 20, the teeth of which mesh into the teeth of the pinions 19. The segments 20 have extensions 21, forming foot-levers, which are provided with pedals 22 on their outer ends. The segments 20 are pivoted in the upper ends of the brackets 18 by means of pins 23.

24 represents the seat.

To the forward end of the body or frame 1 a sleeve 25 is secured, and which projects upwardly from the body or frame. 26 represents a shaft or spindle passing through the sleeve 25 and having upon its upper end a lever 27, by which the shaft may be turned to guide the velocipede. The lower end of the lever has a socket fitting over the upper end of the shaft, and the lever is held adjustably on the shaft by means of a nut 28, so that its height may be regulated.

29 represents a disk or plate secured to the shaft 26 beneath the body or frame 1 and upon which the front end of the body or frame is supported. On the lower end of the shaft there is a cross-head 31, to which the front axle 32 is pivoted by a bolt 33.

34 represents the front wheels mounted on the axle 32. It will be seen that the pivotal connection between the axle and head 31 will permit the front wheels and axle to assume different positions, owing to irregularities in the ground. This is represented by dotted lines in Fig. III.

It will be seen that the turning of the shaft 26 will twist the axle 32 at an angle to the body or frame of the velocipede, and thus the direction of the velocipede is regulated or controlled.

The operation is as follows: A person occupying the seat 24 places his feet on the pedals 22 and moves the levers 21 up and down alternately. As a lever is moved down it turns its wheel 16 (through means of the described connection) in the direction of the arrow, Fig. I. This pulls its lever 9 forward and the power is transmitted to the rear wheels 2 through means of the cog-wheel 5 and pinion 4. The pedal which has been lowered now rises again and the other pedal is depressed, the power from the pedal being depressed being transmitted to the wheels 2 through means of its connection therewith, and thus the action is kept up, the pedals being raised and lowered alternately and the drums or wheels 16 turning backwardly or in the opposite direction to that shown by the arrows in Fig. I each time their pedals rise. By providing a number of holes for the connections between the cords or cables 14 and the levers 9, the connections between the levers 9 and the inner ends of the straps or rods 11, and the connections between the outer ends of the straps or rods and the cranks 8, the throw of the pedals may be adjusted at will, as will be readily understood; and if it is desired to adjust the height or the working movements of the pedals it can be done by removing the pivot-pins 23 and shifting the rack-segments 20 relatively to their pinions 19, so that while the pedals and segments would have the same amount of movement or throw, the movement might start from and move to a higher or lower elevation. This adjustment of the pinions 19 may be further facilitated by forming perforated extensions 18$^a$ on the brackets 18, the perforations being adapted to receive the shafts 17 of the pinions 19, so that by moving the shaft 17 higher up or lower down the leverage may be increased or diminished at will.

It will be understood that the arc of the extensions 18 should be concentric with the centers 23 of the segments, so that by moving the shafts 18 into different holes on the extensions 18 the pinions 19 will yet mesh into the teeth of the segments.

I claim as my invention—

1. In a velocipede, the combination of the body or frame, the rear wheels rigidly secured to an axle or shaft, a pinion on the axle or shaft, a cog-wheel engaging said pinion and mounted on a crank-shaft, vertical levers pivoted to the body or frame and connected to said cranks, oscillating wheels or drums, cords or cables connecting the wheels or drums to said levers, pinions secured to the shaft of said wheels or drums, rack-segments pivoted over said pinions and engaging therewith, and pedals secured to the inner ends of extensions on said rack-segments, substantially as and for the purpose set forth.

2. In a velocipede, the combination of the frame or body 1, rear wheels 2, a pinion 4, secured to the axle of the rear wheels, a cog-wheel 5, engaging the pinion 4, a shaft 6, to which the cog-wheel 5 is secured and which is provided with cranks 8, levers 9, pivoted to the frame or body 1, straps or rods 11, forming a connection between said levers and cranks, oscillating wheels or drums 16, having shafts journaled in sockets 18, cords or cables 14, connecting the drums to the upper ends of said levers, rack-segments 20, journaled in the upper ends of said brackets and having extensions 21, and pedals 22, secured to the inner ends of said extensions, substantially as and for the purpose set forth.

3. In a velocipede, the combination of the body or frame 1, ground-wheels 2, pinion 4, secured to the shaft or axle of the wheels 2, cog-wheel 5, engaging the pinion 4, shaft 6, upon which the cog-wheel 5 is mounted, cranks 8 on the shaft 6, levers 9, pivoted to the body or frame 1 and having a number of perforations, straps or rods 11, having a number of perforations in their outer ends and by which an adjustable connection is made between said levers and cranks, hooks 15, adjustably secured to the upper ends of said levers, wheels or drums 16, secured to shafts journaled in brackets 8, secured to the body or frame 1, cords or cables 15, forming a connection between said hooks and drums, pinions 19 on said drum-shafts, cog-segments 20, engaging said pinions and having extensions 21, and pedals 22, substantially as and for the purpose set forth.

4. In a velocipede, the combination of the frame 1, sleeve 25, secured to the front end of the frame, a shaft 26, passing through said sleeve, a plate 29 on the shaft and upon which the frame or body 1 rests, a lever 27 on the upper end of the shaft 26 and adjustably secured thereto, a cross-head 31 on the lower end of the shaft 26, an axle 32, pivoted to said cross-head, and the front wheels 34, substantially as and for the purpose set forth.

THOMAS W. JAMISON.

In presence of—
A. W. JOHNSON,
J. G. GALLAMORE.